United States Patent Office 3,197,399
Patented July 27, 1965

3,197,399
HYDROCRACKING CATALYST ACTIVATION
Carlyle G. Wight and Robert H. Hass, Fullerton, Calif., assignors to Union Oil Company of California, Los Angeles, Calif., a corporation of California
No Drawing. Filed Oct. 15, 1962, Ser. No. 230,718
15 Claims. (Cl. 208—111)

This invention relates to the catalytic hydrocracking of high-boiling hydrocarbons to produce therefrom lower boiling hydrocarbons, boiling for example in the gasoline range. The invention is directed specifically to novel methods for activating certain types of water-sensitive hydrocracking catalysts which, as a result of prior contact with water at temperatures above about 200° F., are at a relatively low activity level. The type of catalysts here concerned are those comprising a crystalline, zeolitic molecular sieve cracking base, upon which is deposited, preferably by ion-exchange, a Group VIII noble metal hydrogenating component. It has previously been found that hydrocracking catalysts of this nature, in their oxidized state, are susceptible to damage when they are contacted with water or steam at temperatures above about 200° F. It has now been found however that this damage can be substantially erased if the catalysts are subjected to at least one sequence of reduction and oxidation, using a hydrogen-containing gas for the reduction step, and an oxygen-containing gas for the oxidation. Preferably the reduction-oxidation sequence is repeated at least once again following the first sequence, and this is especially desirable in the case of catalysts which have undergone extensive damage as a result of prolonged contact with water in the critical temperature range.

The water damage to the catalysts of this invention ordinarily comes about in one of two ways. Firstly, in the preparation of the catalysts, following the final addition of the Group VIII noble metal hydrogenating component from aqueous solutions thereof, the catalyst is subjected to a drying and calcining operation wherein water vapor may be present at temperatures between about 200° and 900° F. During calcining, the noble metal is converted to an oxide form. The resulting catalysts display a lower hydrocracking activity than could have been obtained had the catalysts been carefully dried at temperatures below about 200° F. before completing the calcining. Secondly, during conventional regeneration of the catalysts by oxidative combustion, considerable amounts of steam may be present in the regeneration gases or may be generated by combustion of hydrocarbonaceous deposits on the catalyst, and there will be resulting damage to the catalyst, particularly at regeneration temperatures of about 400–900° F. The process of this invention is designed primarily to repair the damage undergone by the catalysts in either of these two treatments, but is applicable in any other instance where the catalyst, in its oxidized state, has come into contact with water or water vapor at temperatures above about 200° F.

It is therefore a principal object of this invention to provide methods for calcining and activating the fresh catalysts of this invention so as to obtain maximum activity. It is a further object of this invention to provide methods for regenerating the catalysts herein concerned so as to restore their fresh maximum activity to a greater extent than has heretofore been possible. The overall objective is to extend the total active life of such catalysts and to obtain the most efficient use thereof during their total life span. Other objectives will be apparent from the detailed description which follows.

It is well known in catalytic hydrocracking that catalyst activity declines gradually during use, the rate of deactivation depending to a large extent upon the severity of hydrocracking conditions, and the feedstock employed. This deactivation is due at least largely to the formation of combustible carbonaceous deposits upon the catalyst, e.g., coke, tars, sulfur, nitrogen compounds and the like. When the catalyst has declined to an undesirably low level of activity, the activity may be restored to a considerable degree by combustion at, e.g., 500° to 900° F. with oxygen-containing gases, which combustion is usually followed by a hydrogen reduction step.

We have previously found however that this conventional regeneration procedure does not restore the catalysts of this invention to their original activity, but rather to a much lower activity level, such that temperatures 50–250° F. higher are required to give equivalent conversions, as compared to the fresh catalyst. In our copending application Serial No. 205,103, we have shown that a higher degree of activity is restored to the catalyst if the oxidation-regeneration is carried out entirely at temperatures above 900° F., so as to minimize the damaging effect of water vapor. However, this procedure does not entirely avoid all damage, particularly when large amounts of water are present, and moreover is in some cases difficult to control. Moreover, it would be desirable in many instances to start the regeneration at lower temperatures of, e.g., 500–600° F., so as to permit more rapid regeneration at higher oxygen concentrations than is possible at temperatures above about 900° F., where oxygen content must be more carefully controlled.

Of course the entire difficulty could be avoided if water could be completely excluded during regeneration. This however is not feasible because some water is always generated by combustion of hydrocarbonaceous deposits, and moreover it requires a considerable added expense to provide effective dehydration facilities for dehydrating the input regeneration gases. The process of this invention provides a convenient and economical corrective after-treatment, which renders permissible the use of wet regeneration gases, and relatively low temperatures of, e.g., 500–900° F. during regeneration.

The process of our copending application Serial No. 205,103 may hence be viewed as a preventive measure to minimize water damage to the catalyst during regeneration, while the process of this invention should be viewed as a corrective measure to erase such damage once it has occurred.

We are unable to account with certainty for the observed damaging effects of water vapor upon the catalysts of this invention. Such damage has been observed only in cases where the catalyst, in an oxidized state, comes in contact with water vapor at temperatures above about 200° F., and most markedly at temperatures between about 200° and 900° F. When in the reduced state, the catalysts are apparently not damaged by water vapor in these temperature ranges. The damage therefore appears to be associated with an effect upon the hydrogenating component of the catalyst, rather than the cracking base itself. It has been observed in the case of some hydrocracking catalysts (other than those here preferred) that the activity of the cracking base itself is damaged by contact with water. This type of damage is apparently not corrected by the activation procedure of this invention, but where the cracking base itself is hydrolytically stable, a substantially complete recovery of fresh activity can be obtained by the activation techniques here described.

A complete catalyst regeneration and activation sequence according to the present invention may be performed as follows: The deactivated catalyst at the end of a hydrocracking run is first stripped with hydrogen at, e.g., 700–1,000° F. in order to remove volatile hydrocarbons. The stripped catalyst is then lowered in temperature to about 300–500° F., as by means of cool hydrogen or flue gases, and (after purging out hydrogen)

the oxidative regeneration is commenced in this low temperature range, as by bleeding air or oxygen into the flue gas stream. Low temperatures are used initially in order to control more easily the exothermic oxidation, which is then allowed to proceed in several waves by periodically raising the temperature until a terminal temperature of 800–1,100° F. is reached. It is normally considered unnecessary to exceed temperatures of about 900° F. during the oxidation. The oxidation gases may comprise mixtures of flue gas and air, containing, e.g., 0.5 to 10% by volume of oxygen, and they may contain normally incident amounts of water vapor, but preferably the absolute partial pressure of water vapor in the reactor attributable to the input gases should be less than about 4 p.s.i. The oxidation may be conducted at total pressures of about 50–400 p.s.i.g., but lower or higher pressures may be used if desired. The complete oxidation-regeneration normally requires about 8–200 hours, depending largely upon the amount of deactivating deposits on the catalyst, and is preferably terminated at a temperature of about 850–1,100° F.

Following the oxidation-regeneration step, the reactor is flushed with an inert gas to remove oxygen, and the catalyst is then subjected to the first post-regeneration reducing treatment with hydrogen at temperatures of 0° to 1,400° F., for a period of about 1–8 hours. It is preferred to use substantially dry hydrogen for this reducing treatment, i.e., to maintain the water partial pressure attributable to the input reducing gas at below about 1.0 p.s.i.a., especially during the initial period when the catalyst is mostly in the oxidized state. Further, it is preferable, even when dry hydrogen is used, to maintain reducing temperatures below about 200° F. or above about 900° F., at least during the initial period, because additional water is formed in reducing the hydrogenating component from its oxide form to the free metal. Where the catalyst contains more than about 2% by weight of hydrogenating metal, it is especially desirable to maintain reducing temperatures within the above preferred ranges until most of the metal oxide is reduced. It is further preferred to initiate the reducing treatment at relatively low pressures of, e.g., 0 to 400 p.s.i.g., and then after most of the metal oxide has been reduced, to increase the pressure gradually if desired.

At the end of the first reducing treatment, residual hydrogen is again purged from the reactor, and the first post-regeneration oxidation cycle is initiated, as by gradually cutting air into the inert purge gas. Since little or no water is generated during the oxidation cycle, the entire oxidation may be carried out at any desired pressure, e.g., between about 0 and 2,000 p.s.i.g., and at any desired temperature between about 400° and 1,200° F. It is preferred to use oxidizing gases and pressures such that the absolute partial pressure of water vapor in the reactor is less than about 4 p.s.i. And if the partial pressure of water vapor is greater than about 1 p.s.i., it is preferred to conduct the oxidation at pressures below about 100 p.s.i.g., and temperatures above about 900° F. Pure air or oxygen may be used at this point, and the length of the oxidation step will normally depend on the oxygen concentration in the gas stream. Using air, the oxidation is normally sufficiently complete in about 0.5 to 12 hours.

Following the first post-regeneration oxidation step, the reactor is again purged of oxygen, and the catalyst is reduced with hydrogen to accomplish final activation before it is again placed on-stream for hydrocracking. Alternatively, in cases where there is extensive damage to the catalyst from previous contact with water vapor, it is preferred to repeat the reduction-oxidation cycle at least once again, and up to a total of 6 to 8 complete cycles. Each cycle is found to increase considerably the catalyst activity. Where several reduction-oxidation cycles are employed, better results are normally obtained in a given length of time by using a larger number of cycles, rather than prolonging the reduction or oxidation during one or two cycles. In any event, the post-regeneration treatment should terminate in a hydrogen-reduction phase, since the catalyst is used in the reduced state for maximum hydrocracking activity.

As has been indicated above the activation treatment of this invention is not limited to cases of repairing damage done to the catalyst during regeneration. It is also desirable in cases where the initial wet catalyst has been dried in an oxidized state, wherein water vapor was present at temperatures above about 200° F. It is normally very difficult or impossible during initial activation of the catalyst to effect complete removal of water at temperatures below 200° F. Hence it will be found that one or more of the reduction-oxidation cycles described above will be advantageous in most cases to improve the activity of the catalysts in their freshly calcined state. The activation technique is the same for the fresh catalysts as in the case of the post-regeneration treatment. In either case, it will be apparent that the catalyst is substantially free of carbonaceous deposits when it is subjected to the activation treatment.

In cases where a deactivated catalyst from the hydrocracking run is found to be largely in a sulfided state, it is preferred to extend the terminal hydrogen stripping operation following the hydrocracking run sufficiently so that most of the sulfur is removed from the catalyst as hydrogen sulfide, before initiating the oxidation-regeneration. This normally requires at least about 1 to 2 hours of reduction at temperatures above about 800° F. By operating in this manner, the damaging effects of acidic gases such as sulfur dioxide are minimized during the oxidative regeneration.

The water-sensitive catalysts of this invention are composed of a major proportion of a dehydrated, zeolitic, crystalline molecular sieve cracking base, upon which is deposited a minor proportion of a Group VIII noble metal hydrogenating component. The molecular sieve cracking bases are composed substantially exclusively of silica, alumina and one or more exchangeable zeolitic cations such as hydrogen, sodium, magnesium, calcium, etc. They are further characterized by relatively uniform crystal pores having a diameter between about 6 and 14 Angstroms. Various crystal forms of such molecular sieves are now available and suitable for use herein, e.g., those of the "X," "Y" or "L" crystal types may be employed. Natural or synthetic mordenite, or other naturally occurring zeolites may also be employed. It is preferred to employ molecular sieves having a relatively high $SiO_2/Al_2O_3$ mole-ratio, e.g., between about 2.5 and 10. The most active forms are those wherein the exchangeable zeolitic cations are hydrogen and/or a divalent metal such as magnesium, calcium or zinc. In particular, the Y molecular sieves having crystal pore diameters of about 9–10 A., and wherein the $SiO_2/Al_2O_3$ ratio is about 4–6, are preferred, either in their hydrogen form, or a divalent metal form, preferably magnesium. Normally, such molecular sieves are prepared first in the sodium or potassium form, and the monovalent metal is ion-exchanged out with a divalent metal, or where the hydrogen form is desired, with an ammonium salt followed by heating to decompose the zeolitic ammonium ion and leave a hydrogen ion. It is not necessary to exchange out all of the monovalent metal; the final compositions may contain up to about 6% by weight of NaO, or equivalent amounts of other monovalent metals. Zeolites of this nature are more particularly described in Belgian Patents Nos. 598,582, 598,682, 598,693 and 598,686.

The foregoing cracking bases are compounded, as by impregnation, with from about 0.1% to 5% (weight percent based on free metal) of a Group VIII noble metal hydrogenating component, i.e., platinum, palladium, rhodium, iridium, ruthenium or osmium, or any combination thereof. The metals platinum, palladium and rhodium are preferred, and it is further preferred that such metals be added to the cracking base by ion-exchange. This can be accomplished by digesting the zeolite with an aqueous solution of a suitable compound of the desired hydrogenating metal wherein the metal is present in a cationic form, and then reducing to form the free metal, as described for example in Belgian Patent No. 598,686.

The activated catalysts of this invention may be employed for the hydrocracking of substantially any mineral oil fraction boiling above the conventional gasoline range, i.e., above about 300° F., and usually above about 400°F., and having an end-boiling-point up to about 1,000° F., but preferably not greater than about 850° F. These feedstocks may be sulfur-free, or they may contain up to about 5% by weight of sulfur, in the form of organic sulfur compounds. They may also contain organic nitrogen compounds, but if nitrogen compounds are present, it is ordinarily necessary to utilize hydrocracking temperatures in the upper ranges hereinafter defined. Specific feedstocks contemplated comprise straight-run gas oils and heavy naphthas, coker distillate gas oils and heavy naphthas, deasphalted crude oils, cycle oils derived from catalytic or thermal cracking operations and the like. These feedstocks may be derived from petroleum crude oils, shale oils, tar sand oils, coal hydrogenation products and the like.

Hydrocracking conditions to be employed herein fall within the following ranges:

TABLE 1

|  | Operative | Preferred |
| --- | --- | --- |
| Temperature, ° F. | 400–850 | 500–750 |
| Pressure, p.s.i.g. | 300–5,000 | 750–2,000 |
| LHSV | 0.1–10 | 0.5–5 |
| H₂/oil ratio, s.c.f./b. | 1,000–15,000 | 2,000–10,000 |

Depending upon the severity of the hydrocracking conditions, and the refractoriness of the feed, it will be observed that the activity of the catalyst will have declined considerably after a period of time ranging between a few hours to several months. When the activity has declined to an uneconomic level, the flow of feedstock is terminated, and the regeneration cycle described above is initiated.

The following examples are cited to illustrate the invention and the results obtainable, but are not to be construed as limiting in scope:

*Example I*

This example illustrates the successful activation of a fresh hydrocracking catalyst comprising a Y molecular sieve cracking base upon which was deposited 0.5% by weight of palladium, and wherein about 37% of the ion-exchange sites were occupied by magnesium, and about 46% by hydrogen ions (46% "decationized"). The $SiO_2/Al_2O_3$ mole-ratio of the molecular sieve base was about 5, and the magnesium content was about 1.9% by weight. This catalyst had been prepared by digesting the molecular sieve base in a water solution of palladium salt so as to effect ion-exchange of palladium onto the molecular sieve. The catalyst was then drained, and partially dried at about 200° F., and was then calcined in air for several hours at temperatures ranging from about 200° F. to 950° F. A portion of the catalyst at this stage was reduced with hydrogen and tested for hydrocracking activity at 1,000 p.s.i.g., 1.5 LHSV and 8,000 s.c.f./b. of hydrogen, using as feed a hydrogenated coker distillate gas oil having a boiling range of about 400–800° F. After 35 hours on-stream, it was found that a hydrocracking temperature of 610° F. was required to obtain 50 volume-percent conversion to 400° F. end-point products, this being a measure of the steady-state activity of the fresh catalyst.

Another portion of the fresh catalyst was reduced for 8 hours at 950° F. and 210 p.s.i.g. in a stream of dry hydrogen, then calcined with dry air for 16 hours at 950° F. and 210 p.s.i.g., and finally again reduced with hydrogen for 5 hours and 1,500 p.s.i.g., while gradually reducing the temperature from 950° to 575° F. Under the same hydrocracking conditions (other than temperature), this activated catalyst was found, after 35 hours on-stream, to give 50% conversion of the feed at a temperature of only 555° F., or 55° F. lower than the corresponding temperature required with the fresh, once-calcined catalyst. The superior activity of the twice-calcined catalyst is clearly evident.

*Example II*

This example illustrates the successful regeneration and activation of a coked hydrocracking catalyst comprising a Y sieve cracking base in its hydrogen, or "decationized" form ($SiO_2/Al_2O_3$ ratio about 5; 2.0% by weight $Na_2O$), upon which was deposited by ion-exchange 0.5% by weight of palladium. This catalyst was employed in a cracking run until it became almost completely deactivated by the deposition of 9–12 weight-percent carbon.

The coked catalyst was then reduced with hydrogen and regenerated by oxidation under severely damaging conditions including a water partial pressure of 2.09 p.s.i.a. and temperatures up to about 925° F. Being almost completely inactive at this stage, the catalyst was reduced with hydrogen for 6 hours at 950° F. and 0 p.s.i.g. and was then calcined in pure oxygen for 12 hours at 950° F. and 0 p.s.i.g. After this single activation cycle, and following a final reduction with hydrogen for 3 hours at 700° F. and 1,000 p.s.i.g., the catalyst was found, under the conditions of Example I, to give 50% conversion of the feed at a temperature of 765° F. after 20 hours on-stream. This was about 256° F. higher than the temperature required for the same conversion at 20 hours with the fresh catalyst (before deactivation), and it is thus evident that the catalyst was still far below its maximum activity level.

After this first activity test, the catalyst was again regenerated (to remove hydrocarbon feed) under dry conditions and recalcined for 16 hours at 950° F. and 0 p.s.i.g. in pure oxygen. After reducing with hydrogen, a second activity test was carried out, and 50% conversion was obtained at 682° F. after 20 hours on-stream. Thus, as a result of the second reduction-oxidation treatment, the catalyst regained 83° F. in lost temperature advantage.

After the second activity test, the catalyst was again regenerated (to remove hydrocarbon feed) under dry conditions, and subjected to a series of three reduction-oxidation treatments in sequence. In each reduction treatment the catalyst was reduced for 3 hours at 950° F. in hydrogen, and in each oxidation treatment the reduced catalyst was calcined in oxygen for 3.5 hours at 950° F., all treatments being at atmospheric pressure. After a final hydrogen reduction, a third activity test was carried out under the same conditions, and 50% conversion was obtained at 581° F. after 20 hours on-stream. Thus, as a result of the three short-time reduction-oxidation treatments, the catalyst had regained another 101° F. in lost temperature advantage.

By further repeating the reduction-oxidation treatment, substantially the original fresh activity is regained, such that 50% conversion is obtainable at about 510° F.

When other molecular sieve hydrocracking catalysts, and other activating conditions within the scope of the invention are employed in the foregoing examples, generally similar differential results are obtained. It is not intended that the invention should be limited to the details described above since many variations may be made by those skilled in the art without departing from the scope or spirit of the following claims.

We claim:

1. A method for activating a catalyst comprising a crystalline zeolitic molecular sieve cracking base and a Group VIII noble metal hydrogenating component, said catalyst being substantially free of carbonaceous deposits, but having been partially deactivated by previous contact in its oxidized state with water at temperatures above about 200° F., which comprises subjecting said catalyst initially in an oxidized state to a reduction-oxidation treatment sequence wherein the catalyst is first reduced with hydrogen and then oxidized with an oxygen-containing gas at a temperature between about 400° and 1,200° F., and repeating said oxidation-reduction sequence at least once again.

2. A method as defined in claim 1 wherein each of said hydrogen reduction treatments is continued for about 1–8 hours, and each of said oxidation treatments is continued for about 0.5–12 hours.

3. A method as defined in claim 1 wherein at least the initial portion of said reduction with hydrogen is carried out at a pressure between about 0 and 400 p.s.i.g. and a temperature between about 0° and 1,400° F.

4. A method as defined in claim 1 wherein said zeolitic molecular sieve cracking base is of the Y crystal type having a $SiO_2/Al_2O_3$ mole-ratio between about 4 and 6, and wherein said Group VIII noble metal is palladium.

5. A process for hydrocracking a high-boiling hydrocarbon feedstock to produce lower boiling hydrocarbons, which comprises subjecting said feedstock plus added hydrogen to hydrocracking conditions of pressure and temperature in contact with a catalyst composed and activated as defined in claim 1.

6. A method for regenerating and activating a hydrocracking catalyst which has become substantially deactivated by carbonaceous deposits formed during a hydrocracking run, said catalyst comprising a crystalline zeolitic molecular sieve cracking base and a Group VIII noble metal hydrogenating component, which comprises:

(A) subjecting said deactivated catalyst to oxidative regeneration with an oxygen-containing gas in the presence of water vapor, and at temperatures terminating above about 800° F. in order to effect a substantially complete removal of carbonaceous deposits;

(B) subjecting the regenerated catalyst from step (A) to reduction with hydrogen at temperatures between about 0° and 1,400° F.;

(C) subjecting the reduced catalyst from step (B) to oxidation with an oxygen-containing gas at temperatures between about 400° and 1,200° F.; and (D) repeating said oxidation-reduction steps (B) and (C) at least once again.

7. A method as defined in claim 6 wherein each of said hydrogen reduction treatments is continued for about 1–8 hours, and each of said oxidation treatments is continued for about 0.5–12 hours.

8. A method as defined in claim 6 wherein at least the initial portion of said reduction with hydrogen is carried out at a pressure between about 0 and 400 p.s.i.g. and a temperature between about 0° and 1,400° F.

9. A method as defined in claim 6 wherein said zeolitic molecular sieve cracking base is of the Y crystal type having a $SiO_2/Al_2O_3$ mole-ratio between about 4 and 6, and wherein said Group VIII noble metal is palladium.

10. A process for hydrocracking a high-boiling hydrocarbon feedstock to produce lower boiling hydrocarbons, which comprises subjecting said feedstock plus added hydrogen to hydrocracking conditions of pressure and temperature in contact with a catalyst composed, regenerated and activated as defined in claim 6.

11. A method for activating a fresh catalyst comprising a crystalline zeolitic molecular sieve cracking base and a Group VIII noble metal hydrogenating component, said catalyst being substantially free of carbonaceous deposits, and having been prepared by treating said molecular sieve cracking base with an aqueous solution of a salt of said noble metal followed by a drying and calcining procedure wherein temperatures above about 200° F. are attained before complete drying of the catalyst has occurred, thereby resulting in a partially deactivated catalyst, which comprises subjecting said catalyst, initially in an oxidized state, to a reduction-oxidation treatment sequence wherein the catalyst is first reduced with hydrogen and then oxidized with an oxygen-containing gas at a temperature between about 400° and 1,200° F., and repeating said oxidation-reduction sequence at least once again.

12. A method as defined in claim 11 wherein each of said hydrogen reduction treatments is continued for about 1–8 hours, and each of said oxidation treatments is continued for about 0.5–12 hours.

13. A method as defined in claim 11 wherein at least the initial portion of said reduction with hydrogen is carried out at a pressure between about 0 and 400 p.s.i.g. and a temperature between about 0° and 1,400° F.

14. A method as defined in claim 11 wherein said zeolitic molecular sieve cracking base is of the Y crystal type having a $SiO_2/Al_2O_3$ mole-ratio between about 4 and 6, and wherein said Group VIII noble metal is palladium.

15. A process for hydrocracking a high-boiling hydrocarbon feedstock to produce lower boiling hydrocarbons, which comprises subjecting said feedstock plus added hydrogen to hydrocracking conditions of pressure and temperature in contact with a catalyst composed and activated as defined in claim 11.

References Cited by the Examiner

UNITED STATES PATENTS

| | | | |
|---|---|---|---|
| 2,472,844 | 6/49 | Munday et al. | 208—136 |
| 2,983,670 | 5/61 | Seubold | 208—111 |
| 3,001,968 | 12/61 | Webb | 208—140 |
| 3,048,536 | 8/62 | Coonradt et al. | 208—110 |

ALPHONSO D. SULLIVAN, *Primary Examiner.*